2,847,347

PREPARATION OF IMPROVED THROMBOPLASTIN

Heron O. Singher, Plainfield, and Emanuel A. Swart, Somerville, N. J., assignors to Ortho Pharmaceutical Corporation, a corporation of New Jersey No Drawing. Application May 27, 1954
Serial No. 432,894

6 Claims. (Cl. 167—74)

This invention relates to a method for the preparation of thromboplastin and more particularly relates to a method for the extraction of thromboplastin from rabbit brain or lung tissue or mixtures thereof.

Thromboplastin has accepted value for use in the determination of prothrombin time, which is a measure of the amount of prothrombin present in a tested blood sample. The determination of prothrombin time is useful clinically, for the fact that it varies with a variety of clinical situations has been well established. It is known that vitamin deficient diets may result in prolonged prothrombin time. Biliary diseases frequently result in prolonged prothrombin time and are considered to be related to impaired vitamin K absorption. Impaired liver function results in prolongation of prothrombin time. A variety of drugs such as the salicylates and especially Dicumarol affect the prothrombin time to a degree considered sufficient to be of clinical significance.

The two-stage theory of Morawitz for the mechanism of blood coagulation postulates, as a first stage, the interaction of prothrombin, calcium ion, and thromboplastin which results in the formation of thrombin and, as a second stage, the reaction of thrombin with fibrinogen to form fibrin. Fibrin fibers are largely responsible for the characteristic properties of clotted blood. It has been shown that the addition to blood of small amounts of thromboplastin can accelerate clotting time, generally referred to as prothrombin time, from the usual several minutes down to a few seconds. Thromboplastin, otherwise known as the platelet-tissue factor, is essential to the blood clotting mechanism but has not been definitely identified chemically. The mechanism of the activity and function of thromboplastin in blood clotting is not settled but most workers believe it to be enzymatic and that thromboplastin acts to catalyze the conversion of prothrombin to thrombin probably through an intermediate prothrombin-thromboplastin-calcium complex. Since thrombin is a protein essential to the formation of fibrin and thromboplastin is necessary for the conversion of prothrombin to thrombin, the measurement of prothrombin time, wherein a standardized preparation of thromboplastin is used, has come to be considered as yielding information of great clinical value.

It is an object of this invention to provide an improved thromboplastin product.

It is another object of this invention to provide a method for preparing a standardized preparation of thromboplastin having activity predictable on the basis of determinations carried out with a variety of human plasma samples.

It is another and further object of this invention to provide a method for the preparation of thromboplastin of high activity for use in determining prothrombin time.

Other objects and more particular advantages of the invention will be apparent from the following description and exemplary disclosures.

The objects of this invention are accomplished and an improved thromboplastic material provided by a process in which a first thromboplastic material prepared according to the method of A. J. Quick disclosed in "The Physiology and Pathology of Hemostasis," Lea and Febiger, Philadelphia (1951), p. 121, which comprises the trituration of rabbit brain tissue with an organic solvent such as acetone, and a second thromboplastic material, obtained by the extraction of finely divided rabbit brain or lung tissue, or a mixture of these tissues, with a buffered aqueous alcohol solution containing a low molecular weight amino acid, are both suspended in 0.85 percent sodium chloride solution. The suspension is incubated, centrifuged, calcium chloride is added to the supernatant, and the suspension is centrifuged a second time. Lyophilization of the supernatant from the second centrifugation yields a solid having a greater stability and higher thromboplastic activity than either of the initial thromboplastic materials as evidenced by prothrombin time determinations.

In order that the thromboplastic material prepared according to the process of this invention have an activity greater than that of the initial thromboplastic materials, it is necessary that for each 10 ml. portion of suspension in 0.85 percent sodium chloride, the initial thromboplastic materials be present in a proportion of 50 to 200 mgs. of the thromboplastic material prepared according to the method of Quick, and 20 to 100 mgs. of thromboplastic material prepared by the extraction of rabbit brain or lung tissue, or mixtures thereof, with a buffered aqueous alcohol solution containing a low molecular weight amino acid, and preferably an alkali metal salt of an amino acid having not more than nine carbon atoms; the preferred proportion being 100 to 110 mgs. and 40 to 50 mgs., respectively, in each 10 ml. portion of suspension. The suspension is incubated for about 20 minutes at 50° C. and centrifuged. Sufficient aqueous calcium chloride solution is added to the incubated supernatant to bring the calcium ion concentration to 0.004 to 0.015 molar; the preferred concentration of calcium ion in the incubated supernatant being 0.006 molar. If the calcium ion concentration is less than 0.004 molar the preparation has low thromboplastic activity and if the calcium ion concentration is greater than 0.015 molar the prothrombin time obtained when the preparation is used in a prothrombin determination is significantly increased. The suspension is centrifuged again and lyophilized.

In the preparation of the second thromboplastic material from rabbit brain or lung tissue, or mixtures thereof, by extraction with a buffered aqueous alcohol solution containing a low molecular weight amino acid, the tissue or tissue mixture may be finely divided by any suitable means such as a Waring Blendor which homogenizes the tissue. It is preferred, in order that the yield of thromboplastin be efficient and destruction of thromboplastin at a minimum, for the tissue to finely divided or homogenized at a temperature not above 25° C. and preferably within the range of from —5° to 25° C. and that the step of finely dividing or homogenizing the tissue be accomplished in the presence of the extracting solution. When the tissue is homogenized in a Waring Blendor in the presence of the extracting solution, the homogenizing step has been found to be sufficiently thorough in as short a time as thirty seconds.

The solution used for extracting finely divided tissue is a buffered aqueous alcohol solution. Ethanol or methanol may be the only alcohol in the extracting solution or a mixture of ethanol and methanol may be used. Alcohol or a mixture of alcohols may be present in the aqueous alcoholic extracting solution in an amount from about 5 to 20 percent by volume. If the concentration of alcohol in the extracting solution is less than about five percent by volume, the thromboplastic active material is not obtained in the extracting solution in a state which will allow satisfactory separation thereof from the unextracted residual tissue, and if the concentration of alcohol in the extracting solution is greater than about twenty percent by volume, the solubility of the thromboplastic active material in the extracting solution is significantly decreased. The aqueous alcohol solution is buffered at a pH within the range of from 5 to 8 but the preferred buffering range is 5.5 to 6.5. If the aqueous alcohol solution is buffered at a pH below 5, the amount of the thromboplastic active material extracted from tissue is significantly decreased because its solubility in the extracting solution is markedly lower, and if the aqueous alcohol solution is buffered at a pH above 8, significant amounts of inactive tissue components are present in the extracting solution. It is necessary that an alkali metal salt of a low molecular weight amino acid, and preferably an alkali metal salt of an amino acid having not more than nine carbon atoms, such as alanine, glycine, proline or serine be present as an active part of the buffer system in an amount within the range of from 0.01 to 6.0 percent by weight of the buffered aqueous alcohol extracting solution; the preferred amount of low molecular weight amino acid is from one to two percent by weight. The presence in the extracting solution of the low molecular weight amino acid results in a significant increase in the amount of thromboplastic material extracted by the solution provided the amino acid is present in an amount within the range of from 0.01 to 6.0 percent by weight; if the amount is below this range, the increase in the amount of thromboplastic material extracted from tissue by the solution is not significant, and if the amount is above this range the material dissolved in the extracting solution results in a longer clotting time as measured by our modification of the Shapiro-Weiner method. Any acid buffer system effective over a pH range of 5 to 8 may be used to adjust the pH of the extracting solution. Specific acid buffer systems found suitable contain salts of acids such as phosphoric acid, amino acids, acetic acid and citric acid. An alkali metal hydroxide may be used in conjunction with the acid buffer systems to adjust the pH of the extracting solution to the desired level. (The term "dialysate" as used in this specification designates the material which has failed to pass through the dialysis membrane.)

The amount of buffered aqueous alcohol solution used in the extraction may vary widely but for most efficient extraction of thromboplastin from the tissue it has been found desirable to use at least four milliliters of extracting solution for each gram of tissue to be extracted. The finely divided tissue in association with the buffered aqueous alcohol solution is thoroughly stirred at a temperature not above 25° C. and preferably not above 5° C. and centrifuged. The supernatant is filtered to remove any fat present and dialyzed against distilled water not above 25° C., preferably at a temperature not above 5° C. At a temperature above 25° C. a significant amount of thromboplastic active material is destroyed. The dialysate thus obtained is lyophilized.

In order that those skilled in the art may better understand how the present invention may be carried into effect, the following example is given by way of illustration and not by way of limitation.

*Example I*

In the preparation of the first thromboplastic material, according to the method of Quick; three clean rabbit brains weighing about 21 grams were placed in a glass mortar and covered with 30 cc. of acetone and 0.1 cc. of 0.2 molar sodium citrate. The brains were crushed and mashed with a glass pestle in a manner to avoid grinding. The acetone was poured off, 25 cc. of fresh acetone was added, and the brain tissue was again crushed and mashed. The second portion of acetone was poured off, 25 cc. of fresh acetone was added to the brain tissue and the brain tissue was carefully ground in the presence of the acetone. The acetone was poured off, another 25 cc. portion of acetone was added and the brain tissue was ground under the acetone until it was granular and non-adhesive. The residual brain tissue was filtered by suction, washed six times with 10 cc. portions of fresh acetone, dried by suction, transferred to a filter paper, and dried at 37° C. for thirty minutes. 3.5 grams of ivory-white, finely granular material was obtained.

In the preparation of the second thromboplastic material from the extraction of rabbit brain or lung tissue, or a mixture thereof, with a buffered aqueous alcohol solution containing a low molecular weight amino acid; 76 grams of frozen rabbit brain and 1440 grams of frozen rabbit lung were homogenized at 5° C. for one minute in the presence of 7600 ml. of an aqueous solution containing 150 ml. of an alcoholic solution per liter, prepared by adding 7.5 ml. of methanol, 15 grams of glycine, 4.8 ml. of one molar aqueous sodium acetate solution, and 2.6 ml. of one molar aqueous acetic acid solution to 142.5 ml. of 95 percent ethanol. The homogenate was stirred for two hours at 5° C. and centrifuged at −5° C. for thirty minutes. The supernatant liquid was filtered, dialyzed against distilled water at 5° C. and lyophilized.

In the preparation of the improved thromboplastic material, fifty mgs. of the first thromboplastic material and 40 mgs. of the second thromboplastic material were suspended in 10 ml. of 0.85 percent sodium chloride solution, incubated at 50° C. for twenty minutes and centrifuged. Sufficient dilute aqueous calcium chloride was added to the supernatant to bring the calcium ion concentration to 0.006 molar, and the suspension was again centrifuged. The supernatant, which is a highly active calcium-thromboplastin suspension, may be used without modification in the determination of prothrombin time by our modification of the Shapiro-Weiner method or may be lyophilized and reconstituted with distilled water as desired.

The thromboplastic activity of the first and second thromboplastic materials and of the improved thromboplastic materials was determined by our modification of the Shapiro-Weiner method for determining prothrombin time of blood, described in a book entitled: "Coagulation, Thrombosis and Dicumarol," by Shapiro and Weiner, published in 1949 by the Brooklyn Medical Press, Brooklyn, New York.

A calcium-thromboplastin suspension of the first thromboplastic material was prepared in a test tube by adding 100 mgs. thereof to 10 ml. of 0.85 percent aqueous sodium chloride solution, admixing by inverting the tube three or four times until a uniform suspension was obtained, keeping the suspension in a water bath at 46–50° C. for twenty minutes, centrifuging, cooling the supernatant to room temperature, adding 0.1 ml. of 0.25 molar calcium chloride solution to 4 ml. of the suspension, mixing as above, and centrifuging again.

A calcium-thromboplastin suspension of the second thromboplastic active material was prepared in the same way as above except 20 mgs. of the lyophilized material was added to 5 ml. of 0.85 percent aqueous sodium chloride solution in preparing the starting suspension.

Two-tenths ml. of each of the calcium-thromboplastin suspensions prepared as above and two-tenths ml. of the supernatant from the preparation of the improved thromboplastic material were each added to a separate 0.1 ml. portion of fresh, oxalated, human plasma, which had been prepared by the addition of 0.1 molar aqueous sodium oxalate solution to fresh, human blood in the proportion of one part sodium oxalate solution to nine parts of blood and centrifugation of the oxalated blood. The mixtures were agitated at 37° C. by tilting the test tubes back and forth and timing the first appearance of a fibrin clot. Those containing the first and second thromboplastic materials showed clot formation in 17.8 seconds and 46.2 seconds respectively, and the one containing the improved thromboplastic material showed clot formation in 15.2 seconds after addition of the thromboplastic materials to plasma.

It will be obvious to those skilled in the art that various changes may be made without departing from the spirit of the invention and therefore it is to be understood that the invention is not limited to what is described in the specification and example but only as indicated in the appended claims.

What is claimed is:

1. A process for the preparation of thromboplastic material comprising the steps of: suspending in 0.85 percent aqueous sodium chloride solution a first thromboplastic material, comprising a finely divided tissue residue resulting from the extraction of rabbit brain tissue with acetone; and a second thromboplastic material, resulting from the extraction of finely divided rabbit tissue, selected from the class consisting of brain and lung tissue, with an aqueous solution buffered at a pH within the range of 5–8 and containing an alcohol, selected from the group consisting of methanol and ethanol and mixtures thereof, in the amount of 5–20 percent by volume and 0.01–6.0 percent by weight of an amino acid having not more than nine carbon atoms, separation of the finely divided tissue from the extracting solution and dialysis of the extracting solution against distilled water; the amount in each ten cc. portion of suspension of the first thromboplastic material being 50–200 milligrams and of the second thromboplastic material 20–200 milligrams; incubating the suspension in sodium chloride solution of the first and second thromboplastic materials for about twenty minutes at 50° C., centrifuging the incubated suspension, adding aqueous calcium chloride solution to the supernatant from the centrifugation in an amount such that the calcium ion concentration therein is 0.004–0.015 molar and centrifuging to provide a supernatant containing a highly active thromboplastic material.

2. A process for the preparation of thromboplastic material comprising the steps of: suspending in 0.85 percent aqueous sodium chloride solution a first thromboplastic material, comprising a finely divided tissue residue resulting from the extraction of rabbit brain tissue with acetone; and a second thromboplastic material resulting from the extraction of finely divided rabbit tissue, selected from the class consisting of brain and lung tissue, with an aqueous solution buffered at a pH within the range of 5–8 and containing an alcohol, selected from the group consisting of methanol and ethanol and mixtures thereof, in the amount of 15–20 percent by volume and 0.01–6.0 percent by weight of an amino acid having not more than nine carbon atoms, separation of the finely divided tissue from the extracting solution and dialysis of the extracting solution against distilled water; the amount in each 10 cc. portion of suspension of the first thromboplastic material being 100–110 milligrams, and of the second thromboplastic material 40–50 milligrams; incubating the suspension in sodium chloride solution of the first and second thromboplastic materials for about 20 minutes at 50° C. followed by centrifuging the incubated suspension, adding aqueous calcium chloride solution to the supernatant from the centrifugation in an amount such that the calcium ion concentration therein is about 0.006 molar, and centrifuging to provide a supernatant containing a highly active thromboplastic material.

3. A process for the preparation of thromboplastic material comprising the steps of: suspending in 0.85 percent aqueous sodium chloride solution a first thromboplastic material comprising a finely divided tissue residue resulting from the extraction of rabbit brain tissue with acetone; and a second thromboplastic material resulting from the extraction at a temperature within the range of from −5° C. to 25° C. of finely divided rabbit tissue selected from the class consisting of brain and lung tissue, with an aqueous solution buffered at a pH within the range of 5.5–6.5 and containing an alcohol selected from the group consisting of methanol and ethanol and mixtures thereof, in the amount of 5–20 percent by volume and 1–2 percent by weight of an amino acid having not more than nine carbon atoms, separation of the finely divided tissue from the extracting solution and dialysis of the extracting solution against distilled water; the amount in each ten cc. portion of suspension of the first thromboplastic material being 50–200 milligrams and of the second thromboplastic material 20–200 milligrams; incubating the suspension in sodium chloride solution of the first and second thromboplastic materials for about twenty minutes at 50° C., centrifuging the incubated suspension, adding aqueous calcium chloride solution to the supernatant from the centrifugation in an amount such that the calcium ion concentration therein is 0.004–0.015 molar, and centrifuging to provide a supernatant containing a highly active thromboplastic material.

4. A process for the preparation of thromboplastic material comprising the steps of: suspending in 0.85 percent aqueous sodium chloride solution a first thromboplastic material, comprising a finely divided tissue residue resulting from the extraction of rabbit brain tissue with acetone; and a second thromboplastic material, resulting from the extraction of finely divided rabbit tissue, selected from the class consisting of brain and lung tissue, with an aqueous solution buffered at a pH within the range of 5–8 and containing an alcohol, selected from the group consisting of methanol and ethanol and mixtures thereof, in the amount of 5–20 percent by volume of 0.01–6.0 percent by weight of an amino acid having not more than nine carbon atoms, separation of the finely divided tissue from the extracting solution and dialysis of the extracting solution against distilled water; the amount in each 10 cc. portion of suspension of the first thromboplastic material being 100–110 milligrams, and of the second thromboplastic material 40–50 milligrams; incubating the suspension in sodium chloride solution of the first and second thromboplastic materials about 20 minutes at 50° C. followed by centrifuging the incubated suspension, adding aqueous calcium chloride solution to the supernatant from the centrifugation in an amount such that the calcium ion concentration therein is about 0.006 molar, and centrifuging to provide a supernatant containing a highly active thromboplastic material.

5. A process according to claim 4 in which the amino acid is glycine.

6. A highly active thromboplastic material prepared by suspending in 0.85 percent aqueous sodium chloride solution a first thromboplastic material, comprising a finely divided tissue residue resulting from the extraction of rabbit brain tissue with acetone; and a second thromboplastic material, resulting from the extraction of finely divided rabbit tissue selected from the class consisting of brain and lung tissue, with an aqueous solution buffered at a pH within the range of 5–8 and containing an alcohol, selected from the group consisting of methanol and ethanol and mixtures thereof, in the amount of 5–20 percent by volume and 0.01–6.0 percent by weight of an amino acid having not more than nine carbon atoms, separating the finely divided tissue from the extracting solution and dialysis of the extracting solution against distilled water; the amount in each ten cc. portion of suspension of the first thromboplastic material being 50–200 milligrams and of the second thromboplastic material 20–200 milligrams; incubating the suspension in sodium chloride solution of the first and second thromboplastic materials for about twenty minutes at 50° C., centrifuging the incubated suspension, adding aqueous calcium chloride solution to the supernatant from the centrifugation in an amount such that the calcium ion concentration therein is 0.004–0.015 molar, and centrifuging.

(References on following page)

References Cited in the file of this patent

UNITED STATES PATENTS 2,162,863   Ripke ------------------ June 20, 1939

OTHER REFERENCES

Howard: Modern Drug Encycl., 5th ed., 1952, p. 899.

Poncher: J. Lab. and Clin. Med., No. 27, December 1941, pp. 385–391 (p. 387 pert.).

Hardy: Chem. Abst., vol. 45, March 1951, p. 2046a.

Quick: The Hemorrhagic Diseases, 1942, pp. 64–67.

Wintrobe: Clinical Hematology, 2nd ed., 1946, Lea and Febiger, Philadelphia, Pa., p. 208.

UNITED STATES PATENT OFFICE
CERTIFICATE OF CORRECTION

Patent No. 2,847,347                         August 12, 1958

Heron O. Singher et al.

It is hereby certified that error appears in the printed specification of the above numbered patent requiring correction and that the said Letters Patent should read as corrected below.

Column 3, lines 42, 43, and 44, strike out "(The term "dialysate" as used in this specification designates the material which has failed to pass through the dialysis membrane.)" and insert the same after "lyophilized." in line 58, same column.

Signed and sealed this 21st day of October 1958.

(SEAL)
Attest:

KARL H. AXLINE                                   ROBERT C. WATSON

Attesting Officer                                Commissioner of Patents